US010932443B2

(12) United States Patent
Simon

(10) Patent No.: US 10,932,443 B2
(45) Date of Patent: Mar. 2, 2021

(54) TREAT DISPENSING PET TOY

(71) Applicant: THE KONG COMPANY, LLC, Golden, CO (US)

(72) Inventor: David F. Simon, Lakeland, FL (US)

(73) Assignee: THE KONG COMPANY, LLC, Golden, CO (US)

(*) Notice: Subject to any disclaimer, the term of this patent is extended or adjusted under 35 U.S.C. 154(b) by 514 days.

(21) Appl. No.: 15/724,070

(22) Filed: Oct. 3, 2017

(65) Prior Publication Data
US 2019/0098864 A1 Apr. 4, 2019

(51) Int. Cl.
A01K 5/00 (2006.01)
A01K 15/02 (2006.01)
A01K 5/01 (2006.01)

(52) U.S. Cl.
CPC .......... *A01K 5/0135* (2013.01); *A01K 5/0114* (2013.01); *A01K 15/025* (2013.01)

(58) Field of Classification Search
CPC .... A01K 15/025; A01K 5/0114; A01K 7/005; A01K 39/02; A01K 5/00; A01K 5/01; A01K 5/0135
USPC ................................ 119/72, 61.5–61.55, 710
See application file for complete search history.

(56) References Cited

U.S. PATENT DOCUMENTS

| 2,975,547 | A | * | 3/1961 | Greve | A63B 67/16 446/77 |
|---|---|---|---|---|---|
| 5,002,017 | A | * | 3/1991 | Hollyday | A01K 7/025 119/61.52 |
| 5,758,604 | A | * | 6/1998 | Jørgensen | A01K 15/025 119/711 |
| 5,791,287 | A | * | 8/1998 | Gruber | A01K 7/005 119/61.54 |
| 6,073,581 | A | * | 6/2000 | Wang | A01K 5/0114 119/51.01 |
| 6,167,841 | B1 | * | 1/2001 | Ho | A01K 15/025 119/61.54 |
| 6,526,912 | B1 | | 3/2003 | Ottoson | |
| 6,688,258 | B1 | | 2/2004 | Kolesar | |
| 6,983,722 | B2 | | 1/2006 | Tepper et al. | |
| 7,143,719 | B1 | | 12/2006 | Giddens et al. | |
| 7,270,082 | B2 | * | 9/2007 | Plante | A01K 7/02 119/74 |
| 7,314,023 | B1 | * | 1/2008 | Denny | A01K 5/01 119/61.57 |

(Continued)

*Primary Examiner* — Yvonne R Abbott-Lewis
(74) *Attorney, Agent, or Firm* — Berg Hill Greenleaf Ruscitti LLP

(57) ABSTRACT

A treat dispensing pet toy is shaped and weighted to remain in a normally upright position to dispense treats when contacted by an animal during interaction with the toy. The pet toy has a dome shaped base and a ring or donut-shaped cover connected to the base. A treat dispensing port is arranged on an inside circumferential edge of the cover. A central opening of the cover exposes a feeding tray. The feeding tray and inside circumferential edge define a partially enclosed area to function as a feeding bowl. Edible treats are loaded inside the cover. As the animal contacts the toy, treats are moved within the cover and pass through the dispensing port onto the feeding tray. A diverter disposed within the cover facilitates movement of the treats for easier dispensing of the treats onto the feeding tray. A method includes use of the pet toy to dispense treats.

22 Claims, 8 Drawing Sheets

(56) References Cited

U.S. PATENT DOCUMENTS

| | | | |
|---|---|---|---|
| 7,487,741 B2 * | 2/2009 | Jordan | A01K 7/005 119/61.54 |
| 7,600,488 B2 | 10/2009 | Mann | |
| D639,515 S | 6/2011 | Lui et al. | |
| 8,225,747 B2 * | 7/2012 | Markham | A01K 5/0114 119/51.01 |
| D665,136 S | 8/2012 | Day | |
| D676,202 S | 2/2013 | Hansen | |
| D676,203 S | 2/2013 | Hansen | |
| 8,453,609 B2 | 6/2013 | McCann | |
| 8,474,404 B2 * | 7/2013 | Costello | A01K 15/025 119/51.01 |
| 8,588,967 B2 | 11/2013 | Carelli et al. | |
| 8,588,968 B2 | 11/2013 | Carelli et al. | |
| D697,676 S | 1/2014 | Hansen | |
| D700,755 S | 3/2014 | Reiss et al. | |
| D703,393 S * | 4/2014 | Henley | D30/129 |
| 8,904,967 B2 | 12/2014 | Reiss et al. | |
| 8,919,290 B2 * | 12/2014 | Ottosson | A01K 5/0114 119/707 |
| 8,997,689 B2 * | 4/2015 | Ragonetti | A01K 5/00 119/51.01 |
| 9,049,840 B1 | 6/2015 | Parness | |
| D742,601 S | 11/2015 | Holterhaus et al. | |
| 9,288,969 B2 | 3/2016 | Chirstianson et al. | |
| 9,301,496 B2 | 4/2016 | Reiss et al. | |
| 9,462,787 B2 | 10/2016 | Christianson et al. | |
| 2005/0045115 A1 | 3/2005 | Mann | |
| 2005/0121339 A1 | 6/2005 | Tepper et al. | |
| 2007/0022971 A1 | 2/2007 | Renforth et al. | |
| 2007/0068464 A1 * | 3/2007 | Smith | A01K 15/025 119/709 |
| 2007/0199512 A1 * | 8/2007 | Ellis | A01K 7/005 119/61.54 |
| 2009/0314221 A1 | 12/2009 | Wang | |
| 2009/0314223 A1 | 12/2009 | Yuu et al. | |
| 2010/0083904 A1 | 4/2010 | Pu et al. | |
| 2011/0226187 A1 * | 9/2011 | Bertsch | A01K 5/0114 119/61.55 |
| 2011/0232583 A1 | 9/2011 | Yamin | |
| 2012/0012068 A1 | 1/2012 | Costello | |
| 2012/0152180 A1 | 6/2012 | McCann | |
| 2013/0013104 A1 | 1/2013 | Carelli et al. | |
| 2013/0013106 A1 | 1/2013 | Carelli et al. | |
| 2013/0255579 A1 | 10/2013 | Sharpe | |
| 2014/0261195 A1 | 9/2014 | Reiss et al. | |
| 2014/0318462 A1 | 10/2014 | Reiss et al. | |
| 2015/0068463 A1 | 3/2015 | Worry | |
| 2015/0128875 A1 | 5/2015 | Christianson et al. | |
| 2015/0296743 A1 | 10/2015 | Pietrocarlo et al. | |
| 2015/0342145 A1 | 12/2015 | Christianson et al. | |
| 2016/0120146 A1 | 5/2016 | Parness et al. | |
| 2016/0165845 A1 | 6/2016 | Stone | |
| 2016/0219835 A1 | 8/2016 | Faecher | |
| 2016/0227737 A1 | 8/2016 | Dzamba | |
| 2016/0316719 A1 | 11/2016 | Parness | |
| 2016/0374316 A1 | 12/2016 | Mainini et al. | |
| 2017/0035024 A1 | 2/2017 | Parness et al. | |
| 2017/0303509 A1 | 10/2017 | Stone | |
| 2017/0303510 A1 | 10/2017 | Stone et al. | |

\* cited by examiner

TREAT DISPENSING PET TOY

FIELD OF THE INVENTION

The invention relates to pet toys that dispense food or treats, and more particularly, to a pet treat dispenser and method of dispensing treats wherein animal interaction with the dispenser controls the amount and rate at which treats are dispensed.

BACKGROUND OF THE INVENTION

Some general objectives for pet toys is to keep an animal occupied for an extended period of time and to promote increased exercise. It is generally accepted within the science of animal behavior that animals who are routinely stimulated, preoccupied, or who are otherwise engaged in productive interaction with pet toys exhibit better behavior attributed to reduced anxiety. Interactive toys for pets have become popular as a means to extend animal play and physical activity. Some of these interactive toys may include treats that are dispensed from the toy.

Some of the treat dispensing toys may enable the pet to control how the treats are dispensed by physical contact with the toy. The treats provide additional incentive for the animal to react with the toy in which extended interaction with the toy may result in higher levels of physical activity for the animal.

One example of an animal food dispenser includes the invention disclosed in U.S. Pat. No. 6,526,912. This reference more specifically discloses a dispenser having a base portion and an upper portion defined by at least one wall enclosing a container cavity. An opening is formed in the upper portion to access the container cavity. A weighted body is fixed to the base of the dispenser that has been tipped or moved by the animal. The dispenser can be moved on a surface in an oscillating and/or sliding motion by the animal for dispensing treats from the opening.

Another example of a treat dispensing pet toy is disclosed in the U.S. Pat. No. 8,225,747. The toy includes a body having an interior chamber to receive treats and an opening formed in the body to allow treats to be dispensed through the opening. A base of the device includes weighted material causing the device to reside in a normally upright position. Contact by the animal causes the device to tip, thereby allowing treats to fall through the opening in the body. Changing the amount and type of material used for the weighted material changes the characteristics of how the device moves when contacted by the animal that in turn, changes the rate and amount of treats that are dispensed.

Another example of a treat dispensing toy is disclosed in the U.S. Pat. No. 8,474,404 This reference teaches a pet toy with an adjustable treat dispensing lid connected to a body of the pet toy. A treat holding enclosure receives treats. The enclosure has an open area which communicates with a treat dispensing opening of the lid enabling treats to be selectively dispensed. The lid may be placed at selected positions with respect to the body thereby changing the size of the exposed treat dispensing opening to thereby selectively change the rate at which treats are disposed.

Yet another example of a treat dispensing pet toy is disclosed in the U.S. Pat. No. 9,301,496. The dispenser includes a central spherical body and a plurality of peripherally spaced spheres or balls connected to the body by respective branches. Each of the balls has a treat dispensing opening. The body has an opening for charging or loading treats. The dispenser is substantially hollow. As an animal plays with the device, treats are dispensed through the openings. The openings are located at different positions on each of the balls so that treats are likely to be dispensed when the device is placed at various orientations.

While there are a number of different designs associated with treat dispensing pet toys, there are drawbacks associated with at least some of the prior art. One general drawback for many toys is that when treats are dispensed, they are often ejected or otherwise forced in a direction away from the pet toy. Subsequently, some of the treats may come to rest under furniture or other obstacles which prevent the animal from reaching the treats. Some of the treats may be stepped on by the animal or the pet owner thereby creating an area that may require cleaning. In yet other of the prior art toys, some of the treats may become lodged within the toys, or may otherwise be overly difficult to be dispensed resulting in many unused treats and extra cleaning required for the interior of the pet toy.

Considering the shortcomings of the prior art with respect to many treat dispensing pet toys, there is a need for an interactive treat dispensing pet toy that limits the extent to which treats may be spread or ejected from the toy during animal interaction. There is also a need to provide a treat dispensing pet toy that may also function as a feeder. There is also a need to provide a treat dispensing toy that is easy to clean and easy to load with treats or animal food. The invention described herein provides certain advantages over the prior art by meeting the above enumerated needs.

SUMMARY OF THE INVENTION

The invention in one preferred embodiment is a treat dispensing pet toy that is shaped and weighted to remain in a normally upright position to dispense treats when contacted by an animal during interaction with the pet toy. The pet toy includes a dome or curved shaped base and a cover connected to the base. The cover includes at least one treat dispensing port arranged on an inside circumferential edge of the cover. If more than one port is provided, they are preferably circumferentially spaced along the inside edge of the cover. The cover has a curved ring shape that extends above the base. A central opening of the cover exposes a feeding tray. The feeding tray and the inside edge of the cover define a partially enclosed area that functions like a feeding bowl. The cover is separable from the base by, for example, unscrewing the cover from the base. The cover and base may accordingly have mating sets of threads.

Edible treats or animal feed (collectively referred to hereinafter as "treats") are loaded inside the cover. One way to load the treats is to place the treats through one of the treat dispensing ports. Another way is to separate the cover from the base and load the treats in the circumferential chamber within the cover.

When the animal makes contact with the pet toy, it has a natural tendency to remain upright because of the shape of the base. The base may also have a weighted element to keep the toy in the normally upright position. The toy will rotate, rock, or wobble in response to contact made by the animal. As the toy moves, treats become dislodged from within the chamber of the cover and are moved through the port(s) onto the feeding tray. Further movement of the toy by contact with the animal may cause some of the treats to be ejected from the feeding bowl; however most will remain within the feeding bowl. If the pet toy is turned upside down, the upper curved edge of the cover allows the pet toy to be turned right side up without significant effort because the outer circumferential edge can be lifted by the animal's nose or paw, or easily grasped by the pet owner.

Another feature of the pet toy is a treat diverter that is located within the chamber of the cover and functions to move treats radially inward towards one of the dispensing ports. The treat diverter is a baffle or wall that connects to the outer circumferential edge of the inner surface of the cover and the diverter has at least one surface that extends radially inward. In one preferred embodiment, the treat diverter has two diverting surfaces and a treat receiving receptacle that faces a dispensing port.

The feeding tray may be removable from the cover so weight may be placed in the base. Weight to be added may include a weighted object secured to the interior surface of the base, or the added weight could include loose material such as sand. The base can be selectively weighted such that the pet toy is responsive to the contact made by an animal. For an animal such as a bigger dog, the pet owner may wish to add more weight so the pet toy does not flip upside down without an excessive amount of applied force. For a smaller dog, the pet owner may wish to add less weight with the assumption that the smaller dog will not apply as much force as a larger dog.

According to a method of the invention, the pet toy is provided with treats loaded within the chamber of the cover. The pet toy is presented to an animal. The animal interacts with the pet toy to obtain treats. Contact by the animal with the toy causes the pet toy to wobble, rotate, etc. Motion of the pet toy causes treats to move within the cover and some of the treats will pass through one of the openings of the ports. If a treat diverter is used, some of the treats will contact the diverter surface(s) and will be force radially inward towards one of the dispensing ports. As the treats are dispensed onto the feeding tray, they are presented to the animal for consumption. Continued movement of the pet toy causes more treats to be dispensed from the port(s). The greater intensity and duration of contact by the animal with the pet toy results in a greater amount of treats being dispensed over time.

If the pet toy is to serve as a feeder, the pet owner can load a predetermined amount of food in the chamber of the cover. If the pet toy is to serve as a treat dispenser, the pet owner may wish to load a smaller number of treats.

Considering the structure and function of the pet toy described, in one aspect, it may be considered a treat dispensing pet toy comprising: a base; a cover connected to the base, said cover having a central opening; a feeding tray disposed between said base and said cover, said central opening exposing said feeding tray; and a dispensing port formed on said cover and said dispensing port communicating with said feeding tray.

Other additional features of this first aspect may further include: at least one diverter disposed within said cover, said diverter having at least one diverter edge and a pocket connected to said edge, wherein said diverter is arranged adjacent to said dispensing port to facilitate dispensing of treats; a weight placed in said base; said base is domed shaped; said cover is ring shaped and said central opening is substantially circular shaped; said cover includes an outer circumferential surface, an inner circumferential surface, and a crest interconnecting the inner and outer circumferential surfaces, said dispensing port being formed on said inner circumferential surface; said feeding tray substantially bisects said pet toy and extends across a diameter of said cover; said feeding tray has a first portion that is exposed within said central opening and a second portion that extends radially outward and covered by said cover; and a circumferential flange connected to said base and extending radially outward beyond said base and said cover.

According to another aspect of the invention, it may be considered a treat dispensing pet toy comprising: a base; a cover connected to the base, said cover having a central opening; a feeding tray disposed between said base and said cover, said central opening exposing said feeding tray; a dispensing port formed on said cover and said dispensing port communicating with said feeding tray; and at least one diverter disposed within said cover, said diverter having at least one diverter edge and a pocket connected to said edge, and wherein said diverter is arranged adjacent to said dispensing port to facilitate dispensing of treats.

Other additional features of this second aspect may further include: a weight placed in said base; said base is domed shaped; said cover is ring shaped and said central opening is substantially circular shaped; said cover includes an outer circumferential surface, an inner circumferential surface, and a crest interconnecting the inner and outer circumferential surfaces, said dispensing port being formed on said inner circumferential surface; and said feeding tray has a first portion that is exposed within said central opening and a second portion that extends radially outward and covered by said cover.

According to another aspect of the invention, it may be considered a method of dispensing treats from a pet toy, said method comprising: providing a base, a cover connected to the base, said cover having a central opening; a feeding tray disposed between said base and said cover, said central opening exposing said feeding tray; a dispensing port formed on said cover and said dispensing port communicating with said feeding tray, and wherein the arrangement of the feeding tray and an inside circumferential edge of the cover provide a barrier to prevent ejection of treats away from the pet toy; loading treats within a chamber of said cover; providing the pet toy to an animal who makes contact with the pet toy; dispensing treats from said dispensing port onto said feeding tray in response to the contact, wherein the treats move in a radially inward direction from the dispensing port to the feeding tray to thereby prevent the treats from being ejected away from the pet toy.

Other additional features of this third aspect may further include: providing at least one diverter within said cover, said diverter having at least one diverter edge and a pocket connected to said edge, wherein said diverter is arranged adjacent to said dispensing port to facilitate dispensing of treats when said pet toy is moved by diverting treats radially inward toward said dispensing port.

Other features and advantages of the invention will become apparent from a review of the following detailed description taken in conjunction with the drawings.

DETAILED DESCRIPTION

Figure 1:
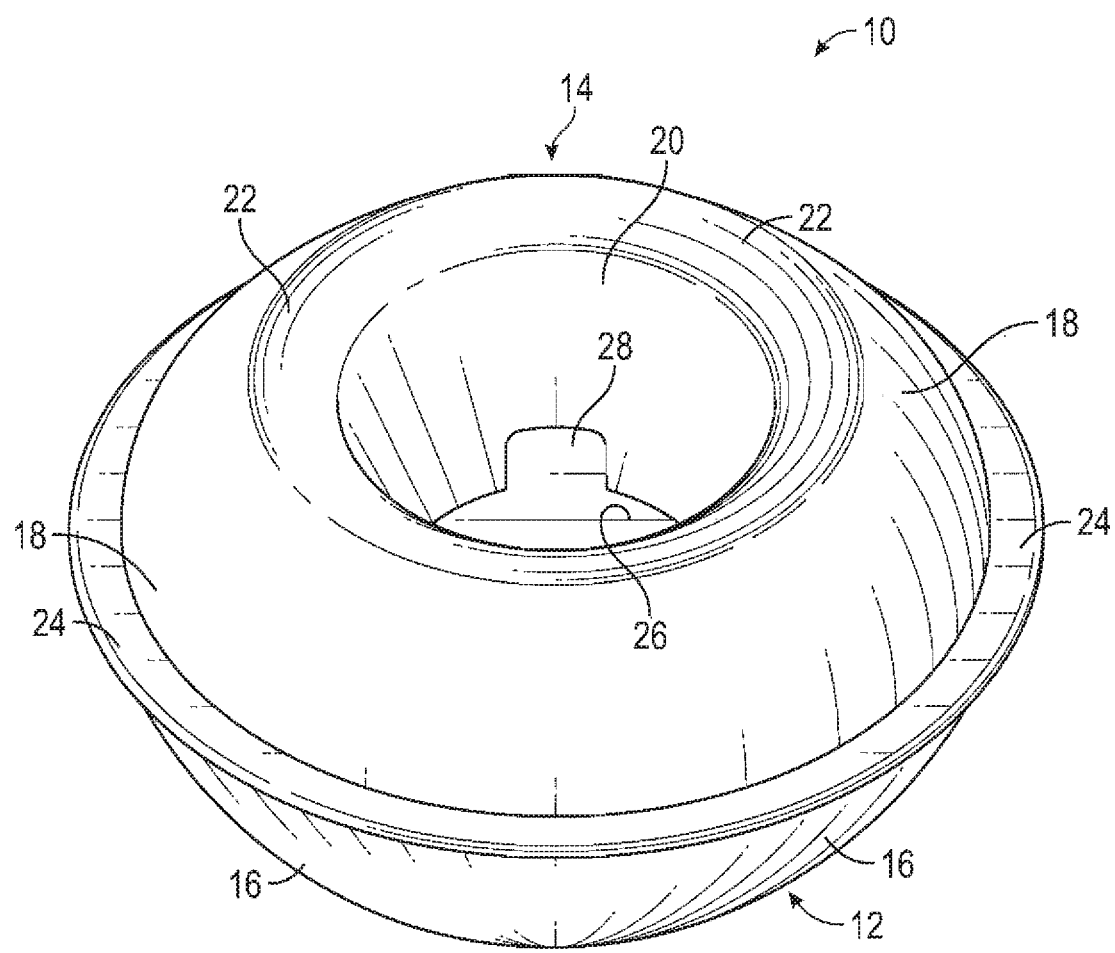
FIG. 1 is a perspective view of the pet toy of the invention.
Figure 2:
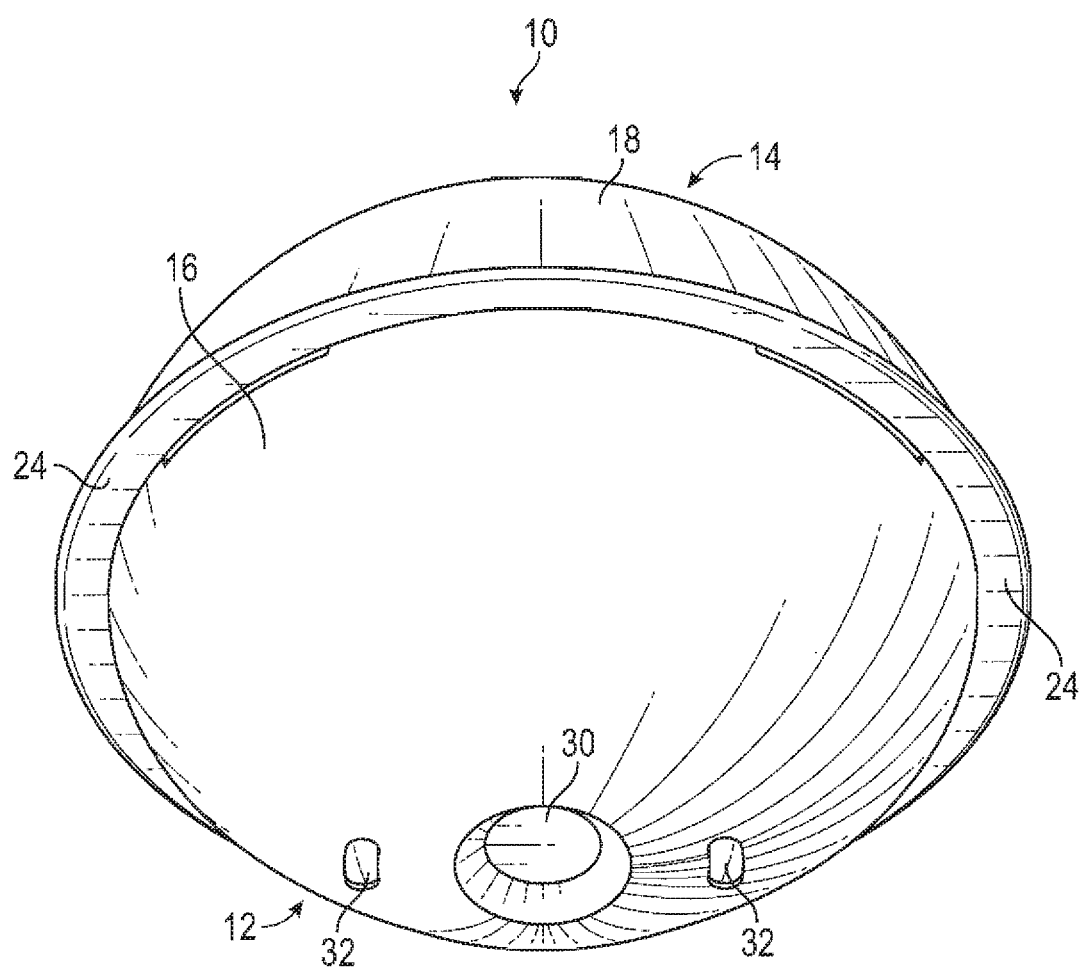
FIG. 2 is another perspective view.

Referring to FIGS. 1 and 2, a preferred embodiment of the invention is shown in the form of a treat dispensing pet toy or dispenser 10. The pet toy has a base 12 and a cover 14 that connects to the base along circumferential flange 24. The base has a dome shape with a corresponding curved body 16. The cover 12 has a ring shape with a central opening. The structure of the cover 12 may be defined as having an outer curved circumferential surface 18, an inner curved circumferential surface 20 that is disposed radially inward from the outer surface 18, and a crest or upper surface 22. At least one treat dispensing port 28 is formed on the inner surface 20. A lower edge or surface of the inner surface 20 contacts an exposed feeding tray 26 located within the central opening of the cover. A hollow space or chamber within the cover is bounded by the surfaces 18 and 20, and crest 22.

Figure 3:
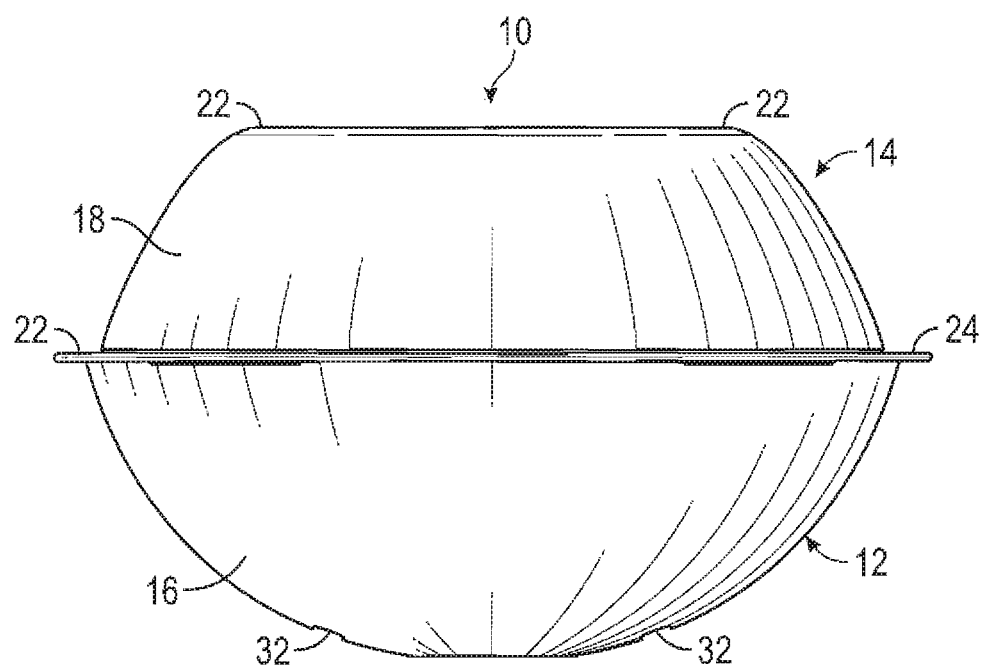
FIG. 3 is a side elevation view of the pet toy.
Figure 5:
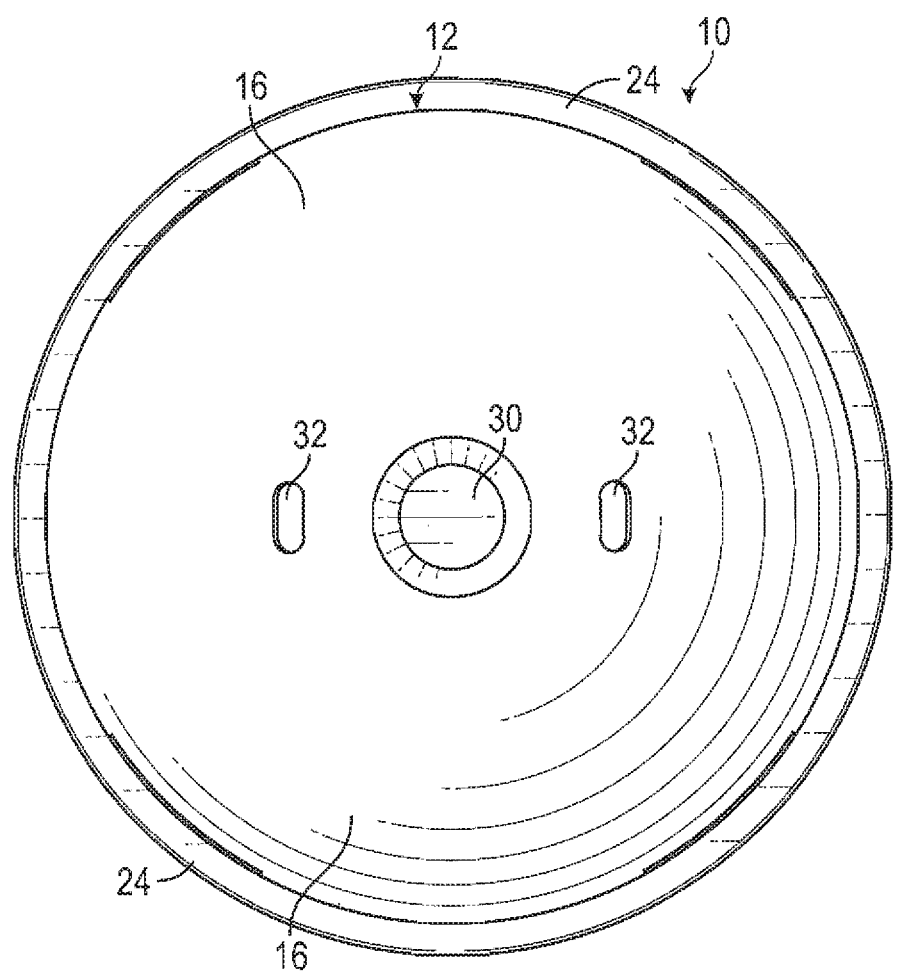
FIG. 5 is a bottom plan view of the pet toy.

As shown in FIGS. 2 and 5, the base 12 further includes at least one drainage opening 32 and a recess 30 that is centered on the lowermost portion of the body 16. The circumstantial flange 24 extends substantially horizontal when the pet toy is positioned upright on a flat surface as shown in FIG. 3.

Figure 4:
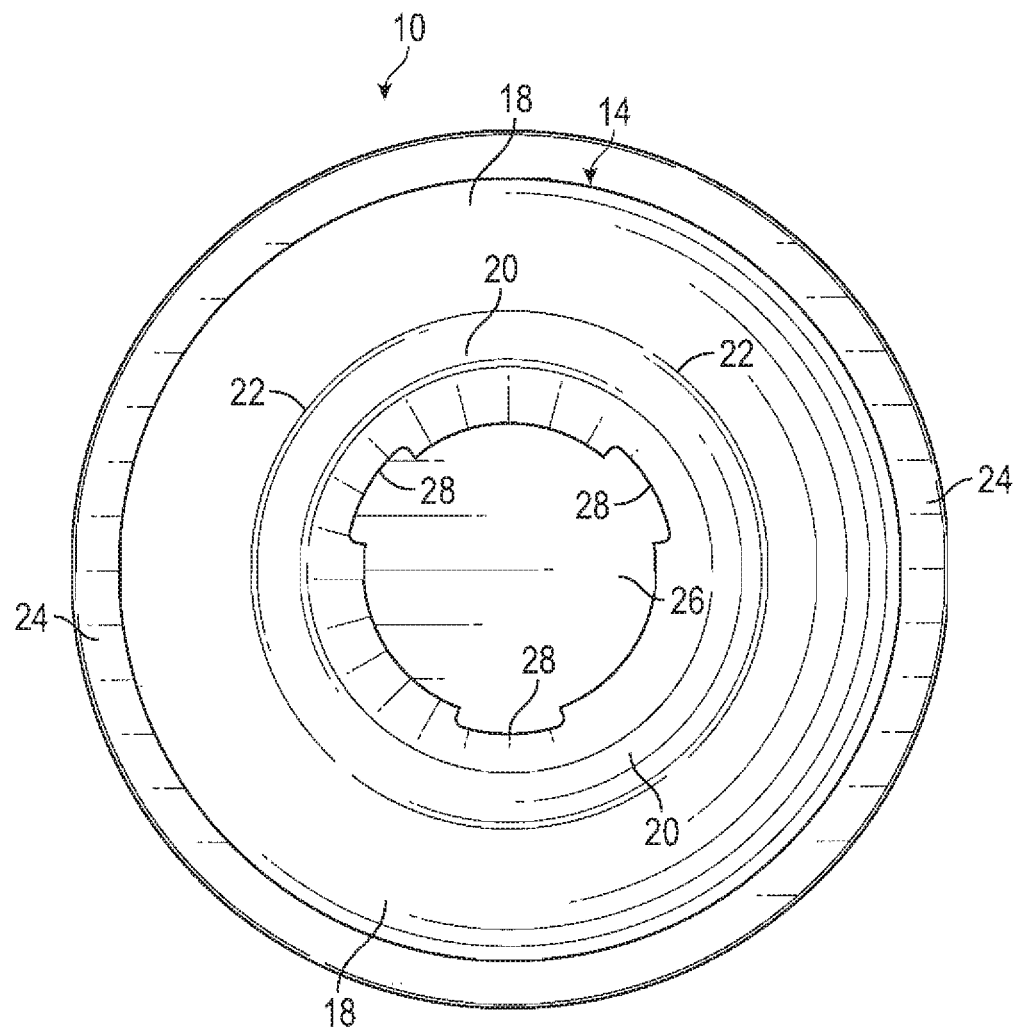
FIG. 4 is a top plan view of the pet toy.

As shown in top plan view of FIG. 4, this preferred embodiment shows three treat dispensing ports 28 that are spaced from one another along the inner surface 20 of the cover. Although three dispensing ports are shown, the pet toy may incorporate at least one port or more ports that are selectively sized and spaced adjacent the inner surface 20. The ports are selectively sized so that treats loaded within the cover can be dispensed when the toy is moved to change the orientation of the pet toy. For example, if the treat is tipped, treats will fall or slide through the ports causing them to reside within the area defined by the feeding tray 26.

Figure 6:
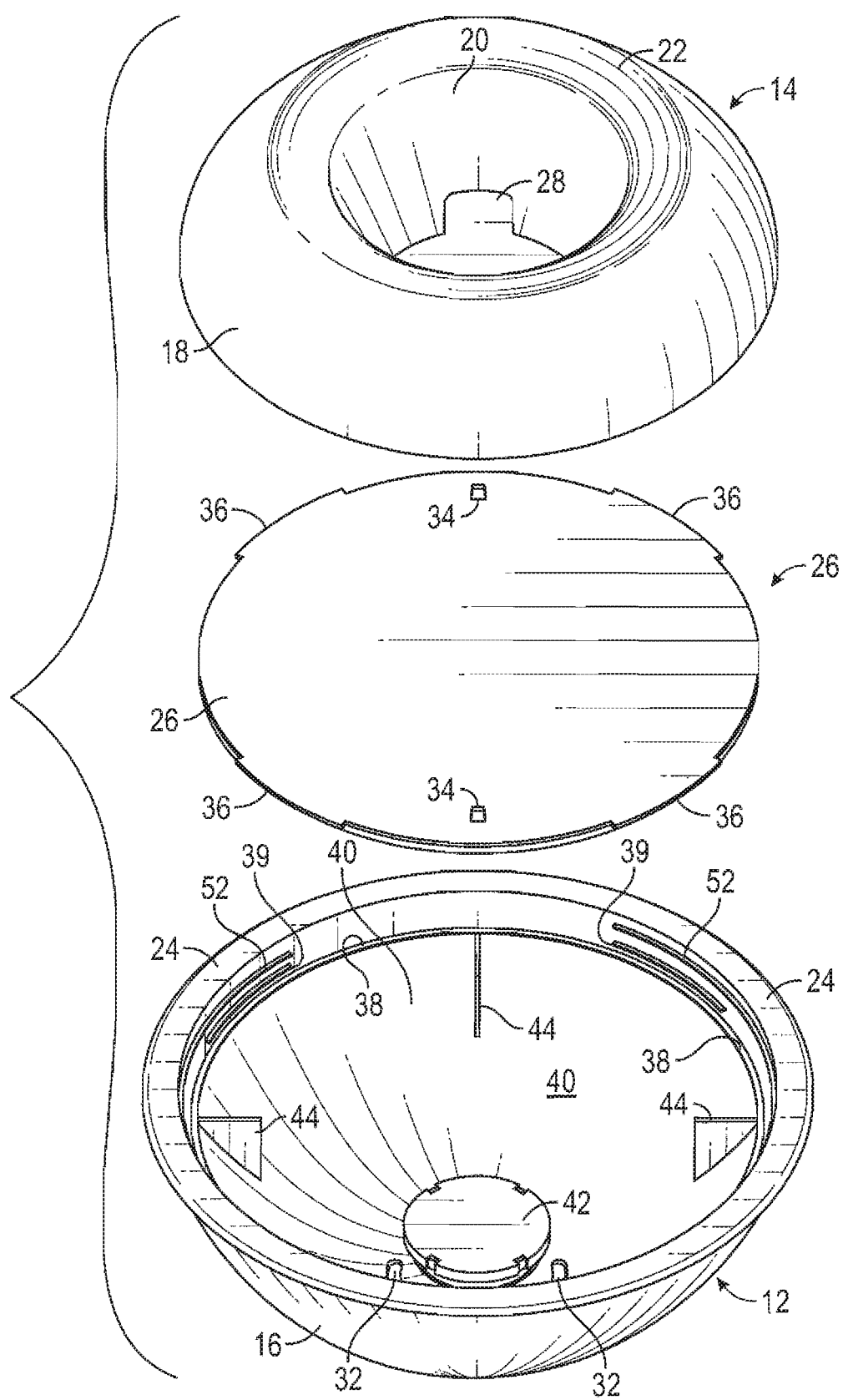
FIG. 6 is an exploded perspective view of the pet toy.

As shown in FIG. 6, the cover 14 is removed from the base 12, and the feeding tray 26 is also removed from the base. The feeding tray 26 is shown as a substantially circular element that rests on a ledge 38 formed on the interior surface 40 of the base 12. The feeding tray may include one or more tabs 36 that are slideable into the gaps between the ledge 38 and one or more protrusions 39 formed along the interior surface 40 of the base 12. Projections 34 located on the upper surface of the feeding tray 26 are provided to grip the feeding tray 26 so it can be rotated to locate the tabs 36 within the gaps. A plurality of support fins 44 extend from the interior surface 40 and an upper edge of the fins 44 serve as further support for the tray 26. A weight 42 may be fixed to the bottom portion of the base to provide additional stability for the base. Another option for adding weight to the base is to fill the base with weighted material such as sand. The feeding tray may be removed from the base for cleaning or to access the cavity or chamber in the base that holds the weight 42 or other weighted material. The cover may be secured to the base by corresponding threads on each. For example as shown in FIGS. 6 and 7, the base may have a set of threads 52 that threadably engage corresponding threads 50 on the top cover.

Figure 7:
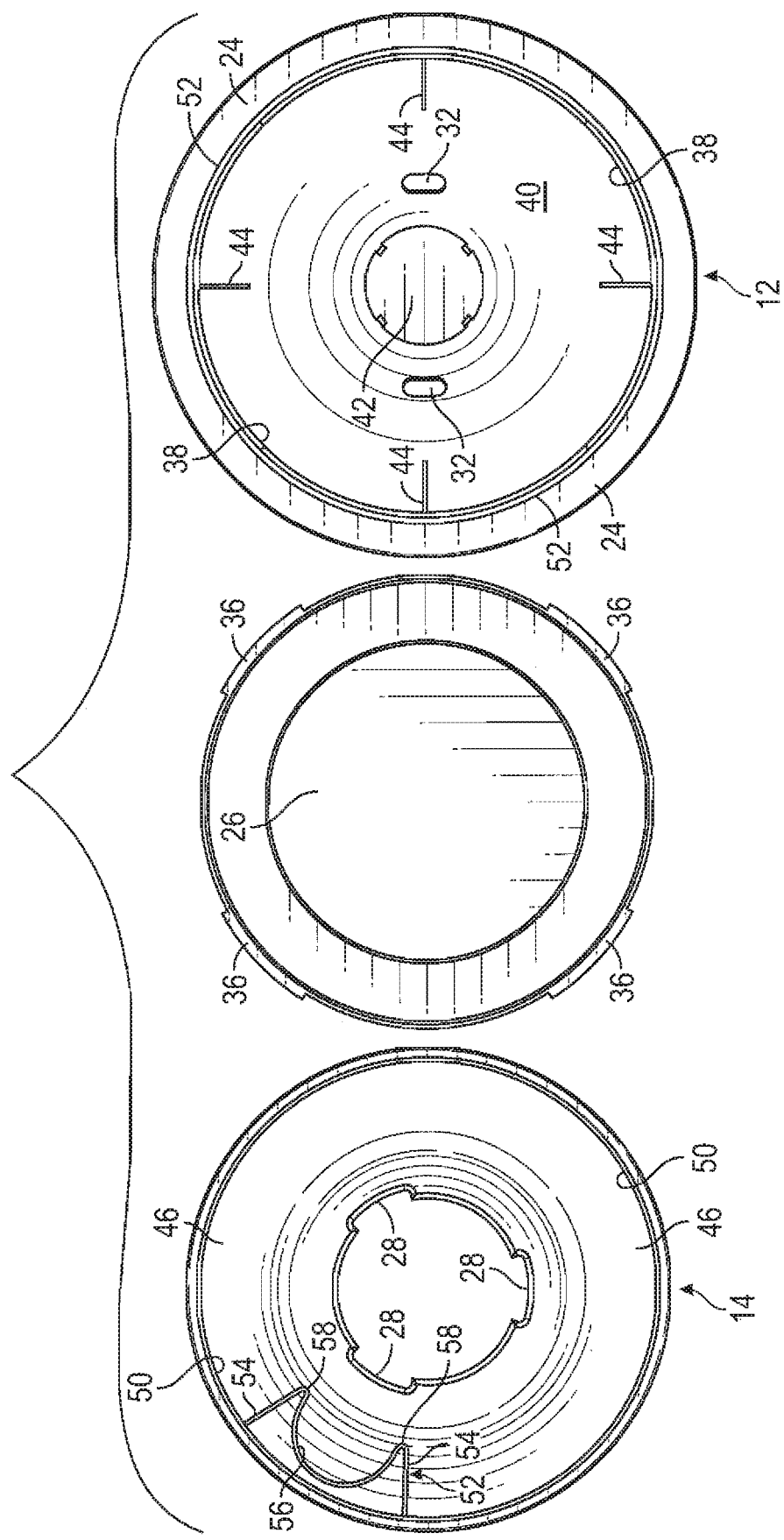
FIG. 7 is a top plan view of the cover turned upside down, a bottom plan view of the feeding tray, and a top plan view of the base with the feeding tray removed to view the interior of the base.
Figure 8:
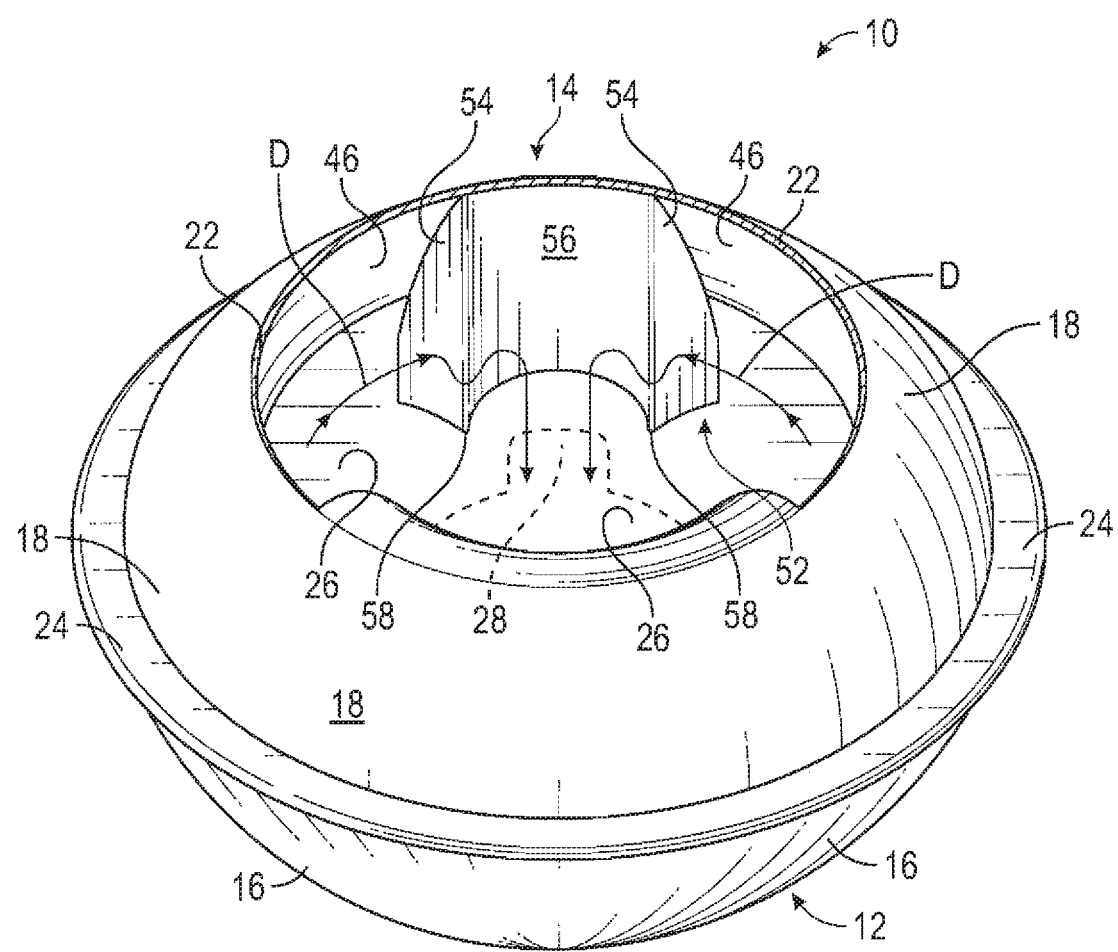
FIG. 8 is a fragmentary cross sectional view of the pet toy showing how treats are dispensed onto the feeding tray by operation of a treat diverter.

FIGS. 7 and 8 show additional details of the invention. One specific feature shown in FIGS. 7 and 8 is the treat diverter 52. The diverter 52 is used to divert or direct treats away from the outer circumferential edge of the interior surface 46 of the cover 14 so that treats may more easily be dispensed. The diverter 52 includes diverter edges 54 interconnected by a pocket 56 that is located opposite or across from a corresponding treat dispensing port 28. FIGS. 7 and 8 show only one diverter 52, but more than one diverter can be provided if it is desired to change the rate of treat dispensing. The diverter 52 is particularly effective in changing the course of movement of treats loaded in the cover 14 particularly when the toy is spun or rotated about the center axis of the toy, defined as the center of the feeding tray. As one may appreciate, if the toy is spun about its center axis, the centrifugal force of spinning will tend to keep treats at positions against the outer circumferential edge of the interior surface 46. However because of the diverter with one or more edges having a radial extending component, treats can be forced to advance beyond the interior radial edges 58 of the diverter into the pocket 56. The treats that reside in the pocket 56 are close to the dispensing port 28 and can more easily move through the corresponding dispensing port 28 onto the feeding tray 26.

Referring specifically to FIG. 8, directional arrows D show paths of how treats can be dispensed onto the feeding tray as the treats are diverted or directed by the diverter 52. Treats may move circumferentially in either direction along the outer circumferential edge of the interior surface 46 as shown. As the treats move, they will first encounter one of the edges 54 that is oriented radially inward toward the dispensing port 28 (in FIG. 8, the port 28 is shown in dashed lines). The treats then pass over the radial edge 58 into the area bounded by the pocket 56. At this location, the treats are located directly adjacent the corresponding dispensing port 28 where the treats are then moved onto the feeding tray 26.

According to a method of the invention, a treat dispenser is provided having a cover defining a chamber in which treats are loaded therein. The treat dispenser with loaded treats is presented to an animal. The animal makes contact with the dispenser, causing it to spin, rotate, tilt, wobble, or make other motions. As the dispenser is moved, treats within the cover displace such that some of the treats will be directed through at least one dispensing port located within a central area of the dispenser. More specifically, the cover includes at least one dispensing port that is directed radially inward towards a center of the dispenser. A feeding tray of the dispenser along with circumferential walls or services which surround the feeding tray defined a feeding bowl into which the treats are directed from the at least one dispensing port. The animal is able to consume the treats as they are moved onto the feeding tray from the at least one dispensing port. In accordance with one optional feature of the method, a diverter is incorporated within the chamber of the cover to facilitate movement of the treats away from an outer circumferential edge of the inner surface of the cover so that the treats can be dispensed onto the feeding tray. The chamber of the cover can be selectively loaded with a desired number and type(s) of treats. According to another optional feature of the method, the base which connects to the cover may be selectively weighted to assist in generating the type of motion associated with the animal that may optimally result in dispensing of the treats. Increasing or decreasing the weight of the base will result in different types of motions or movements of the dispenser.

The invention has been described herein with respect to various preferred embodiments. However, it shall be understood that the invention is not strictly limited to the disclosed preferred embodiments. Therefore the invention should be considered in conjunction with the claims appended hereto.

What is claimed is:

1. A treat dispensing pet toy comprising:
a base
a cover connected to the base, said cover having a central opening;
a feeding tray disposed between said base and said cover, said central opening exposing said feeding tray;
a dispensing port formed on said cover and said dispensing port communicating with said feeding tray;
said cover is ring shaped and said central opening is substantially circular shaped; and
said cover further includes an outer circumferential surface, an inner circumferential surface, and said dispensing port being formed on said inner circumferential surface to enable dispensing of treats onto said feeding tray within said central opening.

2. The treat dispenser, as claimed in claim 1, further including:
at least one diverter disposed within said cover, said diverter having at least one diverter edge and a pocket connected to said edge, wherein said diverter is arranged adjacent to said dispensing port to facilitate dispensing of treats.

3. The treat dispenser, as claimed in claim 1, further including:
a weight placed in said base.

4. The treat dispenser, as claimed in claim 1, wherein:
said base is domed shaped.

5. The treat dispenser, as claimed in claim 1, wherein:
said feeding tray substantially bisects said pet toy and extends across a diameter of said cover.

6. The treat dispenser, as claimed in claim 1, wherein:
said feeding tray has a first portion that is exposed within said central opening and a second portion that extends radially outward and covered by said cover.

7. The treat dispenser, as claimed in claim 1, further including:
a circumferential flange connected to said base and extending radially outward beyond said base and said cover.

8. A treat dispensing pet toy comprising:
a base;
a cover connected to the base, said cover having a central opening;
a feeding tray disposed between said base and said cover, said central opening exposing said feeding tray;
a dispensing port formed on said cover and said dispensing port communicating with said feeding tray; and
at least one diverter disposed within said cover, said diverter having at least one diverter edge and a pocket connected to said edge, and wherein said diverter is arranged adjacent to said dispensing port to facilitate dispensing of treats.

9. The treat dispenser, as claimed in claim 8, further including:
a weight placed in said base.

10. The treat dispenser, as claimed in claim 9, wherein:
said base is domed shaped.

11. The treat dispenser, as claimed in claim 8, wherein:
said cover is ring shaped and said central opening is substantially circular shaped.

12. The treat dispenser, as claimed in claim 11, wherein:
said cover includes an outer circumferential surface, an inner circumferential surface, and a crest interconnecting the inner and outer circumferential surfaces, said dispensing port being formed on said inner circumferential surface.

13. The treat dispenser, as claimed in claim 8, wherein:
said feeding tray has a first portion that is exposed within said central opening and a second portion that extends radially outward and covered by said cover.

14. A method of dispensing treats from a pet toy, said method comprising:
providing a base, a cover connected to the base, said cover having a central opening; a feeding tray disposed between said base and said cover, said central opening exposing said feeding tray; a dispensing port formed on said cover and said dispensing port communicating with said feeding tray, and wherein the arrangement of the feeding tray and an inside circumferential edge of the cover provide a barrier to prevent ejection of treats away from the pet toy;
loading treats within a chamber of said cover;
providing the pet toy to an animal who makes contact with the pet toy;
dispensing treats from said dispensing port onto said feeding tray in response to the contact, wherein the treats move in a radially inward direction from the dispensing port to the feeding tray to thereby prevent the treats from being ejected away from the pet toy.

15. The method, as claimed in claim 14, further including:
providing at least one diverter within said cover, said diverter having at least one diverter edge and a pocket connected to said edge, wherein said diverter is arranged adjacent to said dispensing port to facilitate dispensing of treats when said pet toy is moved by diverting treats radially inward toward said dispensing port.

16. A treat dispensing pet toy comprising:
a base;
a cover connected to the base, said cover having a central opening;
a feeding tray disposed between said base and said cover, said central opening exposing said feeding tray;
a dispensing port formed on said cover and said dispensing port communicating with said feeding tray;
wherein said feeding tray has a first portion that is exposed within said central opening and a second portion that extends radially outward and covered by said cover; and said cover further includes an outer circumferential surface, an inner circumferential surface, and said dispensing port being formed on said inner circumferential surface to enable dispensing of treats onto said feeding tray within said central opening.

17. The treat dispenser, as claimed in claim 16, further including:
at least one diverter disposed within said cover, said diverter having at least one diverter edge and a pocket connected to said edge, wherein said diverter is arranged adjacent to said dispensing port to facilitate dispensing of treats.

18. The treat dispenser, as claimed in claim 16, further including:
a weight placed in said base.

19. The treat dispenser, as claimed in claim 16, wherein:
said base is domed shaped.

20. The treat dispenser, as claimed in claim 16, wherein:
said feeding tray substantially bisects said pet toy and extends across a diameter of said cover.

21. The treat dispenser, as claimed in claim 16, wherein:
said feeding tray has a first portion that is exposed within said central opening and a second portion that extends radially outward and covered by said cover.

22. A treat dispensing pet toy comprising:
a base
a cover connected to the base, said cover having a central opening;
a feeding tray disposed between said base and said cover, said central opening exposing said feeding tray;
a dispensing port formed on said cover and said dispensing port communicating with said feeding tray; and
said cover further includes an outer circumferential surface, an inner circumferential surface, wherein said dispensing port is formed on said inner circumferential surface enabling dispensing of treats onto said feeding tray within said central opening.

\* \* \* \* \*